Patented Oct. 27, 1936

2,058,465

UNITED STATES PATENT OFFICE 2,058,465

A PROCESS OF ADDING A HYDROGEN HALIDE TO A COMPOUND CONTAINING AN OLEFINIC LINKAGE

Morris S. Kharasch, Chicago, Ill., assignor to E. I. du Pont de Nemours & Company, Wilmington, Del., a corporation of Delaware No Drawing. Application December 16, 1933, Serial No. 702,793

11 Claims. (Cl. 260—162)

This invention relates to a process of adding hydrohalogens to olefine hydrocarbons and their derivatives, and more particularly it relates to a method for controlling the reaction to produce addition products of a predetermined character.

Reactions involving an olefine and a hydrogen halide are in general well-known to the art but investigators, in carrying out reactions of this type, have discovered either that a reaction involving an olefine and a given hydrohalide will result in a mixture of isomers or that the reaction will yield one isomer to the practical exclusion of another. In addition, reactions involving the same hydrocarbon and the same hydrogen halide, even when carried out under the same general conditions, yield reaction mixtures of widely diverse character, that is, a reaction carried on at one time may produce one isomer exclusively, while another time it may yield a mixture containing more than one isomer in substantial amounts. Many estimates have been made and much research has been done with a view to solving the discrepancies referred to but no theory has as yet been devised which would enable one to predict with exactness the composition of a product to be obtained.

In addition, in many reactions of this character where one isomer may be desired, for some reason unaccountable to the art, it has been impossible to produce the desired isomer, either quantitatively or in any desired amount. The present invention concerns itself with a method for controlling the reaction between olefines and hydrogen halides to produce, with uniformity, halogen derivatives of a predetermined character.

One object of the present invention comprises the control of reactions involving the addition of hydrogen halides to olefines to produce a given addition product. A further object of the invention comprises the control of reactions of this type to yield a given product in substantially quantitative amounts. A further object of the invention comprises reacting a hydrogen halide and the olefine in the presence of an antioxidant. Further objects of the invention will become apparent from the following description of the invention.

It has now been found that the addition of hydrogen halides to olefines or halogenated olefines may be controlled by the use of antioxidants.

The addition of hydrogen halides to the double bond of an olefine hydrocarbon or a substituted olefine hydrocarbon containing an unsaturated bond, will occur in the absence of antioxidants, but where different sources of olefine are used the results and the character of the reaction products will show a wide lack of uniformity.

Furthermore the reaction carried out in the absence of an antioxidant will yield either one isomer to the practical exclusion of another or will produce an isomer different from that produced predominately if an antioxidant is used. In any event the effect of the presence of the antioxidant is to produce one type of isomer while the effect of not using an antioxidant is to favor the production of a different isomer. It is believed that the reason for this difference in results lies in the fact that the presence of peroxides or hydroperoxides plays an important part in the character of the isomer produced and this effect can be either controlled or eliminated by the use of antioxidants. Oxygen may be found to give results resembling those obtained in the presence of peroxides, owing to its ability to form peroxides with many olefines. The fact that its effect is a result of a peroxide formation is shown by the fact that the olefines may be exposed to oxygen for a suitable period and then the free oxygen completely removed by distillation in vacuo leaving only that oxygen which is combined as peroxides of the olefine and the reaction will progress as though the oxygen were present. The following examples, which are to be construed as illustrative only, represent various forms of applying the invention.

Example 1

One mol. of propylene and 1.23 mols of hydrogen bromide were sealed in an air-tight pressure vessel in vacuo (in the absence of air) and were allowed to stand at room temperature for 18 hours. At the end of this period, the vessel was opened and the products were isolated by fractionation. It was found that a 95% yield of propyl bromide had been obtained and the product was 100% isopropyl bromide, identified as isopropyl mercury bromide.

Example 2

One mol. of propylene, 1.23 mols of hydrogen bromide, 0.05 mol. of thiocresol and 0.0001 mol. of manganese chloride were sealed in an air-tight pressure vessel in the complete absence of air and allowed to stand at room temperature for 18 hours. At the end of this period, the vessel was opened and the products were isolated by fractionation. It was found that a 95% yield of propyl bromide had been obtained and the product was 100% isopropyl bromide.

Example 3

In the manner of Example 1, 1 mol. of propylene and 1.23 mols of hydrogen bromide were reacted, but in this case before the addition of the hydrogen bromide, oxygen was passed through the propylene at −78° C. for ten minutes and when the vessel was closed no effort was made to evacuate. Isolation of the product showed a 95% yield of propyl bromides, but only 79% of the product was the isopropyl isomer.

Example 4

In the manner described in Example 2, 1 mol. of propylene and 1.23 mols of hydrogen bromide were reacted, but in this case the antioxidant mixture (thiocresol and manganese chloride) was omitted and instead there was added 0.041 mol. of benzoyl peroxide. Isolation of the product showed a yield of over 87% of n-propyl bromide.

Example 5

Example 4 was repeated, allowing air to be enclosed in the vessel with the reactants and the product was over 96% n-propyl bromide.

Example 6

One mol. of propylene, 1.23 mols. of hydrogen bromide and 0.13 mol. of ascaridole were enclosed in an air-tight vessel and held at −78° C. for 32 minutes. Isolation of the product gave a good yield of propyl bromides which proved to be 100% n-propyl bromide, the isopropyl isomer being absent.

The above six examples demonstrate the manner in which the addition of hydrogen bromide may be controlled to yield either iso-propyl bromide in the absence of peroxides, or n-propyl bromide in the presence of peroxides.

Example 7

One mol. of pure allyl bromide was sealed in a reaction vessel in the dark and in the absence of air with 1.5 mols of hydrogen bromide and 0.11 mol. of diphenyl amine. After reacting for 11 days, a 97.5% yield of bromides was obtained which proved to be over 89% pure, 1,2-dibromopropane.

Example 8

Repeating Example 7 but omitting the antioxidant, diphenyl amine and substituting 0.023 mol. of benzoyl peroxide, the reaction gave a 95.4% yield in 18 hours, of which less than 18% was 1,2-dibromopropane, over 82% of the product being 1,3-dibromopropane.

The examples illustrate that the reaction of addition of hydrogen halides to double bonds of olefines and olefinic derivatives may be controlled by the presence or absence of antioxidants. In some cases the normal reaction is a reaction which takes place in the presence of an antioxidant or to put it differently, in the absence of peroxides or hydroperoxides. In other cases the better known reaction is that which takes place in the presence of a peroxide but regardless of the nature of the normal reaction, the character of the reaction products will be influenced by either diminishing or limiting any peroxide which may be present.

It will be understood that the amount of antioxidant to be added will be varied according to the product desired and the character of the antioxidant, and that by such variation a wide variety of products may be produced, including not only single isomers, but also mixtures of isomers.

Antioxidants suitable for use in the practice of the invention are those compounds recognized as being effective to prevent the atmospheric oxidation of rubber, fats and oils. The term "antioxident" will be construed throughout the specification and claims to include those substances which act to eliminate the peroxides or conditions favoring the formation of peroxides as catalysts. Thus antioxidants are any materials which may be added and by their presence permit the same reactions to be carried out in air or in the presence of peroxides which would otherwise be obtained only in the absence of air and peroxides.

Antioxidants which are suitable for the practice of the invention are such as: the usually accepted rubber antioxidants, also diphenylamine, hydroquinone, catechol, pyrogallol, other polyhydroxy phenols, carvacrol, cresol, dibutylamine, phenyl-a-naphthylamine, thiophenols, thiocresol, thiophenols in conjunction with manganese salts, phenyl-b-naphthylamine, tertiary butyl isocyanide, dimethylaniline, mercaptobenzo thiazole, mono- and dibenzylaminophenol, and other compounds well known for the prevention of atmospheric oxidation of rubber, fats and oils. The more powerful the antioxidant the higher the yield of the products, the formation of which the antioxidant favors, thus diphenylamine and phenylnaphthylamine are quite effective but the sulfur containing antioxidants, particularly thiophenol and thiocresol are exceedingly powerful.

It is believed that the effect of peroxides upon the manner of addition of hydrohalogens involves the intermediate formation of a peroxide to carry the reaction in a particular manner, and conversely the effectiveness of any antioxidant in overcoming the effect of the peroxide, is in part dependent upon the ease of formation of peroxides of the olefine. Thus some olefines or their derivatives, such as vinyl bromide, are so sensitive to traces of peroxides that an antioxidant which would be satisfactory in a given concentration in another olefine might appear to be almost without effect in this particular case.

It has been also found that other experimental conditions, such as surface, temperature, pressure, light and radiation by activating waves may have a secondary influence upon the course of these reactions, but only insofar as they effect the activity of the peroxides or antioxidants present, or upon the reactions which they catalyze. Thus in the addition of HBr to allyl bromide, the peroxide catalyzed reaction resulting in the formation of the 1,3-dibromo- product has a very much greater temperature coefficient than the uncatalyzed reaction, therefore at high temperatures, a very little peroxide is capable of bringing about a 100% yield of the 1,3-addition, whereas at low temperature the reaction becomes very slow and further, the velocity of the catalyzed reaction is disproportionately decreased and appreciable amounts of the uncatalyzed product (the 1,2-dibromopropane) may appear even in the presence of the catalyst. Likewise, in the addition of HBr to allyl bromide, radiation with infra-red is without effect upon the uncatalyzed reaction, except that the velocity of the reaction is increased, and in the presence of antioxidants, the reaction in the presence of infra-red radiation is identical with that observed in the dark, but in the catalyzed reaction, the peroxide is greatly activated and the catalyzed reaction is promoted, resulting in greater speed of addition and higher yields of the catalyzed product, the 1,3-dibromopropane. In the same manner, solvents may assist the peroxides in activating the catalyzed reaction, or promote the effectiveness of the antioxidants in disposing of peroxides. In no case yet observed however does the solvent as such, effect the direction of the reaction, except insofar as it, itself, may form peroxides, or may be an antioxidant. Thus, ligroin when allowed an opportunity to oxidize, may form traces of peroxides which are somewhat effective in bringing about the peroxide behavior and on the other hand tertiary butyl isocyanide is a weak antioxidant and at the same time tremendously accelerates the speed of the reaction. Acetic acid or other acids such as phenylacetic, propionic, etc., may act as antioxidants, not per se, but because they possess the ability to decompose peroxides.

The invention is applicable to reactions involving hydrohalides in general and particularly hydrogen chloride and hydrogen bromide, while any of the olefines or substituted olefines may be used. To indicate the wide application of the invention it includes, for example, reactions between any of the hydrohalogens and propylene, allyl chloride, vinyl bromide, vinyl chloride and any of the other olefines and substituted olefines. In the application of these principles to the addition of hydrogen iodide to olefines, it has been found that the hydrogen iodide itself is sufficiently powerful reducing agent to destroy the peroxides present and, therefore, generally results in the reaction which is characteristic in the absence of peroxides. In general then it may be said that the process of this invention is applicable to any reaction involving the addition of the hydrogen halide to a compound containing olefinic unsaturation.

Thus it is obvious that by the practice of this invention certain marked advantages are obtainable. It is not only possible to prepare a given compound or mixture of compounds as desired but it is also possible to prepare certain new compounds. Other advantages will be apparent from the above description and specific examples.

By the term "antioxidant per se", as used herein and in the claims, the applicant limits this expression to those antioxidants recognized as effective in preventing the atmospheric oxidation of a compound selected from the class consisting of rubber, fats, and oils.

It is apparent that many widely different embodiments of this invention may be made without departing from the spirit and scope thereof and it is not intended to be limited except as indicated in the appended claims.

I claim:

1. In the process of controlling the adding of hydrogen halide to a compound taken from the class consisting of mono-olefine hydrocarbons and halogen substituted mono-olefine hydrocarbons so as to form in predominating amount a desired isomer, the step which comprises adding to the reaction mass an antioxidant per se.

2. In the process of controlling the adding of a hydrogen halide to a mono-olefine hydrocarbon so as to form in predominating amount a desired isomer, the step which comprises adding to the reaction mass an antioxidant per se.

3. In the process of controlling the adding of a hydrogen halide to a mono-olefine hydrocarbon in the presence of a solvent so as to form in predominating amount a desired isomer, the step which comprises adding to the reaction mass an antioxidant per se.

4. The process of controlling the adding of a hydrogen halide to an olefinic linkage of a compound taken from the class consisting of mono-olefine hydrocarbons and halogen substituted mono-olefine hydrocarbons so as to form in predominating amount a desired isomer which comprises carrying out the reaction in the presence of a solvent which is also an antioxidant per se.

5. In the process of controlling the adding of a hydrogen halide to a compound taken from the class consisting of olefinic hydrocarbons and halogen substituted olefine hydrocarbons so as to form in predominating amount a desired isomer, the step which comprises adding to the reaction mass an antioxidant taken from the class consisting of diphenylamine and phenylnaphthylamine.

6. In the process of controlling the adding of hydrogen bromide to a compound taken from the class consisting of aliphatic hydrocarbons containing one alpha olefinic linkage and their halogen substituted olefine products so as to form in predominating amount a desired isomer, the step which comprises adding to the reaction mass an antioxidant per se.

7. In the process of controlling the adding of hydrogen bromide to a compound taken from the class consisting of aliphatic hydrocarbons containing one alpha olefinic linkage and their halogen substituted olefine products in the presence of a solvent so as to form in predominating amount a desired isomer, the step which comprises adding to the reaction mass an antioxidant per se.

8. The process of controlling the adding of hydrogen bromide to an olefinic linkage of a compound taken from the class consisting of aliphatic hydrocarbons containing one alpha olefinic linkage and their halogen substituted olefine products so as to form in predominating amount a desired isomer, which comprises carrying out the reaction in the presence of a solvent which is also an antioxidant per se.

9. In the process of controlling the adding of hydrogen bromide to a compound taken from the class consisting of aliphatic hydrocarbons containing an alpha olefinic linkage and their halogen substituted olefine products so as to form in predominating amount a desired isomer, the step which comprises adding to the reaction mass an antioxidant taken from the class consisting of diphenylamine and phenylnaphthylamine.

10. In the process of controlling the adding of a hydrogen halide to a compound taken from the class consisting of olefinic hydrocarbons and halogen substituted olefine hydrocarbons so as to form in predominating amount a desired isomer, the step which comprises adding to the reaction mass an antioxidant taken from the class consisting of thiophenol and thiocresol.

11. In the process of controlling the adding of hydrogen bromide to a compound taken from the class consisting of aliphatic hydrocarbons containing an alpha olefinic linkage and their halogen substituted olefine products so as to form in predominating amount a desired isomer, the step which comprises adding to the reaction mass an antioxidant taken from the class consisting of thiophenol and thiocresol.

MORRIS S. KHARASCH.